(12) United States Patent
Kessler

(10) Patent No.: US 12,711,127 B1
(45) Date of Patent: Aug. 18, 2026

(54) INTEGRATED VISUAL RELATIONAL DATA EXPLORER

(71) Applicant: CDW LLC, Vernon Hills, IL (US)

(72) Inventor: Joseph Kessler, Grayslake, IL (US)

(73) Assignee: CDW LLC, Vernon Hills, IL (US)

( * ) Notice: Subject to any disclaimer, the term of this patent is extended or adjusted under 35 U.S.C. 154(b) by 0 days.

(21) Appl. No.: 16/688,689

(22) Filed: Nov. 19, 2019

(51) Int. Cl.
*G06F 16/242* (2019.01)
*G06F 16/21* (2019.01)
*G06F 16/248* (2019.01)
*G06F 16/26* (2019.01)
*G06F 16/28* (2019.01)
*G06F 16/9032* (2019.01)

(52) U.S. Cl.
CPC ........ *G06F 16/2423* (2019.01); *G06F 16/211* (2019.01); *G06F 16/213* (2019.01); *G06F 16/248* (2019.01); *G06F 16/26* (2019.01); *G06F 16/287* (2019.01); *G06F 16/2428* (2019.01); *G06F 16/90328* (2019.01)

(58) Field of Classification Search
CPC .... G06F 16/2423; G06F 16/248; G06F 16/26; G06F 16/213; G06F 16/287; G06F 16/2428; G06F 16/90328; G06F 16/9038
See application file for complete search history.

(56) References Cited

U.S. PATENT DOCUMENTS 5,428,737 A * 6/1995 Li ....................... G06F 16/2428
5,737,591 A * 4/1998 Kaplan ................ G06F 16/248
5,933,831 A * 8/1999 Jorgensen ............. G06F 16/288
6,016,488 A * 1/2000 Bosworth ........... G06F 16/2428
6,470,335 B1 * 10/2002 Marusak ............ G06F 16/2428 715/837
6,490,581 B1 * 12/2002 Neshatfar ........... G06F 16/2428
6,519,618 B1 * 2/2003 Snyder .................. G06Q 10/10 707/738
6,640,221 B1 * 10/2003 Levine ............... G06F 16/2428 707/999.005

(Continued)

OTHER PUBLICATIONS

71 Joseph W. Habraken, The Complete Idiot's Guide to Microsoft Access 2000, chapter 12 (Year: 1999).*

(Continued)

*Primary Examiner* — Justin R. Blaufeld
(74) *Attorney, Agent, or Firm* — MARSHALL, GERSTEIN & BORUN LLP; Randall G. Rueth

(57) ABSTRACT

A computer-implemented method includes displaying a schema explorer GUI, receiving a query parameter, generating a graph by filtering a table using the query parameter, and displaying the updated visual graph in the schema explorer GUI. A server includes a processor and a memory storing instructions that, when executed by the one or more processors, cause the server to display a schema explorer GUI, receive a query parameter, generate a graph by filtering a table using the query parameter, and display the updated visual graph in the schema explorer GUI. A non-transitory computer readable medium containing program instructions that when executed, cause a computer to display a schema explorer GUI, receive a query parameter, generate a graph by filtering a table using the query parameter, and display the updated visual graph in the schema explorer GUI.

20 Claims, 7 Drawing Sheets

(56) References Cited

U.S. PATENT DOCUMENTS 7,461,077 B1 * 12/2008 Greenwood ........ G06F 16/2428 707/999.102
8,560,494 B1 * 10/2013 Downing .............. G06F 16/211 707/726
11,113,274 B1 * 9/2021 Thiel ...................... G06N 20/00
11,429,264 B1 * 8/2022 Weir ................... G06F 3/04842
11,853,911 B1 * 12/2023 Brezis ................. G06F 16/2282
2002/0055939 A1 * 5/2002 Nardone ............... G06F 16/273
2002/0199034 A1 * 12/2002 Beckett ..................... G06F 8/34 719/328
2004/0006570 A1 * 1/2004 Gelb ....................... G06F 16/13 707/999.102
2005/0256852 A1 * 11/2005 McNall ............... G06F 16/2425
2006/0149769 A1 * 7/2006 McCormack ......... G06F 16/284
2006/0282454 A1 * 12/2006 Hernandez-Sherrington ............. G06F 3/0481 707/999.102
2009/0049031 A1 * 2/2009 Hepburn ............. G06F 16/2425 707/999.005
2009/0216728 A1 * 8/2009 Brainerd ............... G06F 16/248
2010/0161646 A1 * 6/2010 Ceballos ............. G06F 16/2428 707/769
2010/0318583 A1 * 12/2010 Cohen .................. G06F 16/248 707/E17.141
2013/0179807 A1 * 7/2013 Day ........................ G06F 16/26 715/810
2014/0280334 A1 * 9/2014 LeBlanc ............. G06F 21/6227 707/770
2015/0347501 A1 * 12/2015 Goshen ............... G06F 16/2423 707/766
2016/0179930 A1 * 6/2016 Radivojevic .......... G06F 3/0482 707/792
2017/0316084 A1 * 11/2017 Pogrebtsov ........... G06F 16/287
2018/0032551 A1 * 2/2018 Huizenga .............. G06F 16/258
2018/0137667 A1 * 5/2018 Kindelsberger ...... G06F 3/0482
2020/0050680 A1 * 2/2020 Murphy .............. G06F 16/2428
2020/0371678 A1 * 11/2020 Angelini ............. G06F 16/2425

OTHER PUBLICATIONS

Institute of Electrical and Electronics Engineering, Authoritative Dictionary of IEEE Standards Terms 597 (7th Ed., Dec. 2000) (Year: 2000).*

PremiumSoft, Navicat Data Modeler 3.0 is released, https://www.navicat.com/en/company/press/1294-navicat-data-modeler-3-0-is-released.html (Year: 2019).*

PremiumSoft, Navicat Data Modeler Release Notes, https://www.navicat.com/en/products/navicat-data-modeler-release-note (Year: 2019).*

PremiumSoft CyberTech, Navicat Data Modeler Version 3 User Guide, available at https://www.navicat.com/manual/pdf_manual/en/navicat_data_modeler_3/win_manual/modeler_en.pdf (Year: 2019).*

Navicat for MySQL, downloaded from the Internet at: <https://www.navicat.com/en/products/navicat-for-mysql> (product launched 2002).

PgAdmin, PostgreSQL Tools, retrieved online at: <https://www.pgadmin.org/> (2002).

* cited by examiner

INTEGRATED VISUAL RELATIONAL DATA EXPLORER

FIELD OF THE DISCLOSURE

The present disclosure is generally directed to methods and systems for visual relational data exploration and, more particularly, to techniques for implementing graphical interfaces and processing components for accessing and modifying data.

BACKGROUND

Electronic databases are a fundamental tool in the software developer's toolbox. Electronic databases are used to store sensitive information critical to the operation of businesses. However, many types and varieties of electronic databases have proliferated over time, and legacy database systems (e.g., a legacy relational database management system (RDBMS)) may lack features of newer, more modern database systems, RDBMS or otherwise.

For example, some legacy database systems were developed during a time in the history of computing when storage space (e.g., computer memory and/or hard disk storage) was limited to an amount that is small by current standards (e.g., a few bytes or less). As such, these legacy database systems were developed using certain patterns and practices that are considered less than optimal by today's standards. One such limitation specifically relates to the naming of databases and database tables. Some versions of legacy databases impose character-length limitations. In such legacy databases, database names, table names, and/or field names are limited to a character limit (e.g., six characters). Such limited names do not allow the database administrator (e.g., a software developer, database administrator etc.) to assign a meaningful name to database schema.

A modern company may store many (e.g., thousands or more) legacy databases that include many (e.g., tens of thousands) of tables, and many (e.g., millions or more) individual rows. The legacy databases may be decades old, in some cases, and the original database schema creators long gone from the company. A new software developer at the company may not be able to tell, by inspecting the database and table names, what data is contained therein. Known techniques do not enable users to view database or entity schemas, or to query those schemas. Similarly, known techniques for database exploration do not include automatic filtering and data display capabilities for displaying a schema a visual format.

Furthermore, developers add features to electronic databases and RDBMSes over time, and such features may be widely adopted, and yet missing from legacy database systems. For example, some legacy database systems entirely lack concepts such as database transactions, foreign keys, primary keys, and other concepts that are widely used in more modern database systems to provide data integrity and to improve performance. Inherent limitations in older database systems, and lack of newer features are two problems identified in the prior art.

BRIEF SUMMARY

In one aspect, a computer-implemented method of includes causing a schema explorer graphical user interface to be displayed in a display device of a computing device of a user, wherein the schema explorer graphical user interface includes a visual graph of a database schema including at least one table node, receiving, via the computing device of the user, an indication of the user including at least one query parameter, generating an updated visual graph by filtering the visual graph of the database schema including the at least one table node using the at least one query parameter; and causing the updated visual graph to be displayed in the schema explorer graphical user interface of the computing device of the user.

In another aspect, a system includes one or more processors and a memory storing instructions that, when executed by the one or more processors, cause the server to cause a schema explorer graphical user interface to be displayed in a display device of a computing device of a user, wherein the schema explorer graphical user interface includes a visual graph of a database schema including at least one table node, receive, via the computing device of the user, an indication of the user including at least one query parameter, generate an updated visual graph by filtering the visual graph of the database schema including the at least one table node using the at least one query parameter; and cause the updated visual graph to be displayed in the schema explorer graphical user interface of the computing device of the user.

In yet another aspect, a non-transitory computer readable medium includes program instructions that when executed, cause a computer to cause a schema explorer graphical user interface to be displayed in a display device of a computing device of a user, wherein the schema explorer graphical user interface includes a visual graph of a database schema including at least one table node, receive, via the computing device of the user, an indication of the user including at least one query parameter, generate an updated visual graph by filtering the visual graph of the database schema including the at least one table node using the at least one query parameter; and cause the updated visual graph to be displayed in the schema explorer graphical user interface of the computing device of the user.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overview

The embodiments described herein relate to, inter alia, methods and systems for visual relational data exploration. In an embodiment, techniques for implementing graphical interfaces and processing components for accessing and modifying data are provided.

In an embodiment, the present techniques allow a user (e.g., a database administrator, software developer, non-technical user, etc.) to inspect database schemas (e.g., orders, customers, or any other table). In an embodiment, the present techniques allow the user to view data related to a particular entity (e.g. order) without writing queries. In an embodiment, the present techniques allow a user to duplicate an entire structure (e.g., only relevant parts) for later cloning. In an embodiment, the present techniques allow a user to compare data (e.g., orders) and produce a report. The present techniques make debugging and testing easier, and can be used ubiquitously by an organization's non-technical users (e.g., by members of a sales solutions team). Empirical evidence has demonstrated that the present techniques have saved many (e.g., thousands) of hours of human labor for development and quality assurance users.

The embodiments disclosed herein allow enterprise employees (e.g., a user, administrator, manager, programmer, etc.) to, inter alia, view, administer, and query database data (e.g., data stored in a relational database). One or more relational database may be part of a database management system (DBMS), such as a relational DBMS (RDBMS). Herein, the term "database" may be understood to refer to an electronic database. Herein, the terms "database system", "RDBMS", and the like may refer to electronic database systems, such as MySQL, Oracle, etc. Herein, a "schema" generally refers to the structure of a database and/or database table, such as the columns, data types, indexes, etc.

Exemplary Computing Environment

Figure 1:
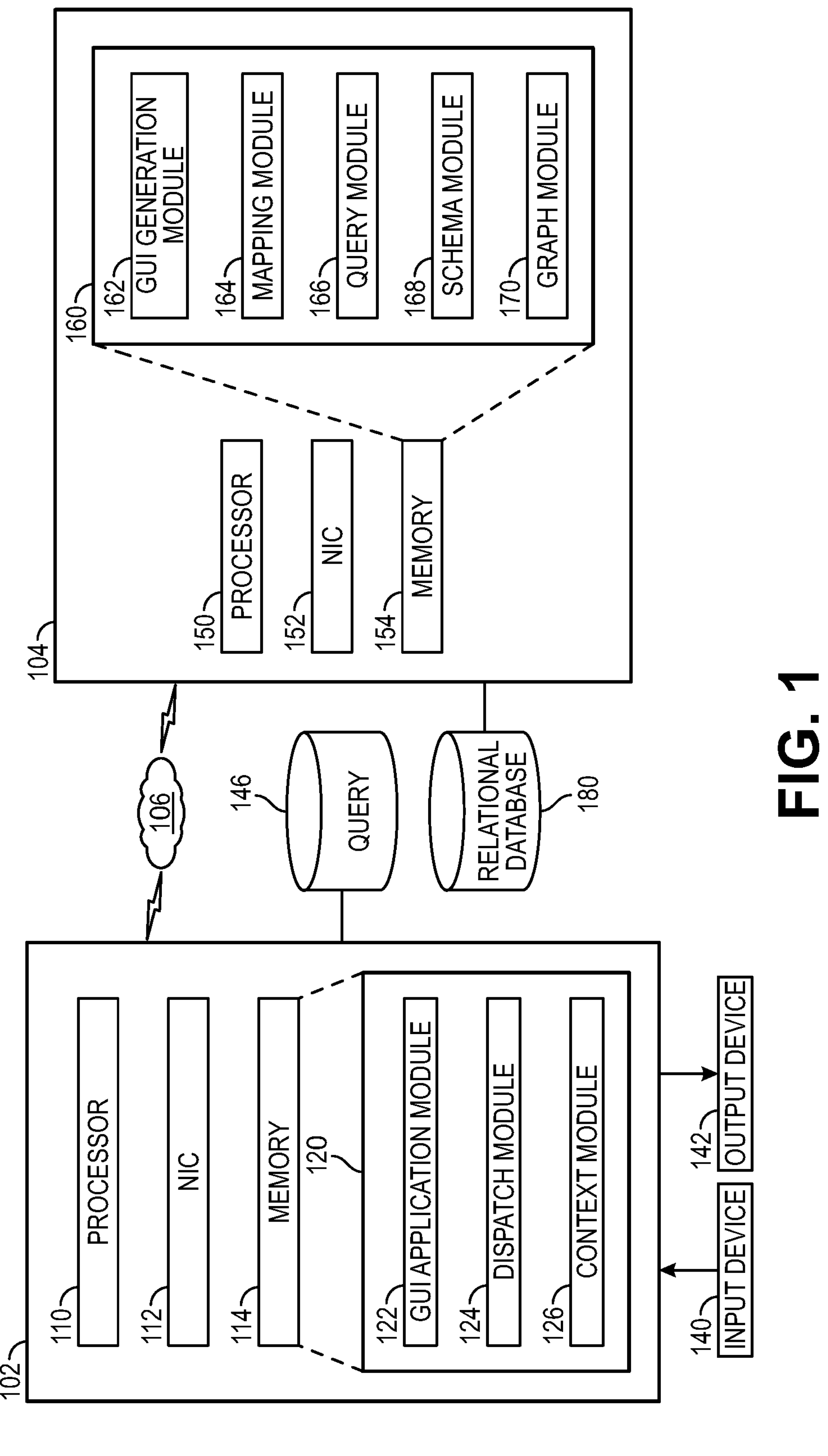
FIG. 1 depicts an exemplary computing environment in which techniques for visual relational data exploration may be implemented, according to one embodiment.

FIG. 1 depicts an exemplary computing environment 100 in which the techniques disclosed herein may be implemented, according to an embodiment. The environment 100 includes a client computing device 102, a remote computing device 104, and a network 106. Some embodiments may include a plurality of client computing devices 102 and/or a plurality of remote computing devices 104.

The client computing device 102 may be an individual server, a group (e.g., cluster) of multiple servers, or another suitable type of computing device or system (e.g., a collection of computing resources). For example, the client computing device 102 may be any suitable computing device (e.g., a server, a mobile computing device, a smart phone, a tablet, a laptop, a wearable device, etc.). In some embodiments, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.).

The network 106 may be a single communication network, or may include multiple communication networks of one or more types (e.g., one or more wired and/or wireless local area networks (LANs), and/or one or more wired and/or wireless wide area networks (WANs) such as the Internet). The network 106 may enable bidirectional communication between the client computing device 102 and the remote computing device 104, or between multiple client computing devices 102, for example.

The client computing device 102 includes a processor 110 and a network interface controller (NIC) 112. The processor 110 may include any suitable number of processors and/or processor types, such as CPUs and one or more graphics processing units (GPUs). Generally, the processor 110 is configured to execute software instructions stored in a memory 114. The memory 114 may include one or more persistent memories (e.g., a hard drive/solid state memory) and stores one or more set of computer executable instructions/modules 120, including a graphical user interface (GUI) application module 122, a dispatch module 124, and a context module 126.

The client computing device 102 includes an input device 140 and an output device 142. The input device 140 may include any suitable device or devices for receiving input, such as one or more microphone, one or more camera, a hardware keyboard, a hardware mouse, a capacitive touch screen, etc. The output device 142 may include any suitable device for conveying output, such as a hardware speaker, a computer monitor, a touch screen, etc. In some cases, the input device 140 and the output device 142 may be integrated into a single device, such as a touch screen device that accepts user input and displays output. The client computing device 102 may be associated with (e.g., owned/operated by) a company that services enterprise customers.

The NIC 112 may include any suitable network interface controller(s), such as wired/wireless controllers (e.g., Ethernet controllers), and facilitate bidirectional/multiplexed networking over the network 106 between the client computing device 102 and other components of the environment 100 (e.g., another client computing device 102, the remote computing device 104, etc.).

The one or more modules 120 implement specific functionality. For example, in an embodiment, the GUI application module 122 includes computer-executable instructions that, when executed, cause one or more GUIs to be displayed in the display device 142 of the client computing device 102. The GUI application module 122 may include one or more bindings libraries for accessing electronic databases. For example, the GUI application module 122 may include a library of client bindings for accessing a structured query language (SQL) database (e.g., a MySQL database, an Oracle database, etc.) or another type of database (e.g., a not only SQL (NoSQL) database). A non-limiting list of NoSQL electronic databases that may be accessed by the GUI application module 122 bindings includes: Apache Cassandra, Apache CouchDB, Bigtable, MongoDB, and Redis. The electronic databases accessed by the bindings in the GUI application module 122 may reside in the client computing device 102, the remote computing device 104, and/or another location accessible by the network 106. For example, the GUI application module 122 may access an electronic database via a socket, a persistent network connection, or any other suitable means. In some cases, an electronic database may reside entirely in the memory 114 (i.e., an in-memory database). The GUI application module 122 may load one or more databases/tables into the in-memory database.

The GUI application module 122 may construct one or more GUIs and receive/retrieve information received from an electronic database in the one or more GUIs. For example, as discussed below, the GUI application module 122 may query an electronic database, and receive rows corresponding to the query from the electronic database. The GUI application module 122 may display the rows in a paginated list. The GUI application module 122 may display a subset of the rows. The GUI application module 122 may allow a user to browse the various databases included in a RDBMS, and the respective tables included in each of the various databases. Thus, by navigating the GUIs rendered by the GUI application module 122, the user may explore the databases and tables of the RDBMS. In some embodiments, the GUI application module 122 allows the user to view other aspects of the RDBMS, including users, permissions, configuration data, indices, keys, etc. The GUI application module 122 may receive inputs from a user (e.g., a business user, an AM, etc.) via the input device 140, and may display outputs (e.g., application screens and data) to the user via the output device 142.

The dispatch module 124 may retrieve context from the context module 126 and transmit the context to the remote computing device 104. The context module 126 may track the name of the table and the current context. The context may include the currently-selected table, the currently-executing query, the state of one or more database cursors, etc. In general, a module such as the dispatch module 124 may determine the status of queries and database bindings by using the context module 126. For example, the dispatch module 124 can determine, by accessing the context module 126, whether a query is currently executing or has completed and whether query results (e.g., rows/records) are ready for display Based on the current context and the name of the table, the GUI generation module 162 may call the schema module 168 to retrieve the table corresponding to the table name, and any tables that are related to the table (e.g., via a foreign key lookup). The GUI generation module 162 may transmit information via the NIC 152 back to the client device 102, wherein the GUI application module 122 receives the information via the input device 140 and displays the information in the output device 142. The information transmitted and displayed may be a graphical representation of part of the database schema (e.g., a hierarchical data structure corresponding to the graph of the plurality of table schema of the visual graph 204), wherein the table selected by the user is in focus, or centered, in the visual graph 204. In some embodiments, the GUI application module 122 may include instructions for animating graphical transitions from a first table to a second, user-selected table. For example, the transmitted information may be an encoded representation of the table schema and values (e.g., a JavaScript Object Notation (JSON) representation). In response to receiving the encoded representation from the remote computing device 104, the GUI application module 122 of the client device 102 may evaluate the encoded representation to generate the graph of the plurality of table schema of the visual graph 204.

The remote computing device 104 includes a processor 150 and a network interface controller (NIC) 152. The processor 150 may include any suitable number of processors and/or processor types, such as CPUs and one or more graphics processing units (GPUs). Generally, the processor 150 is configured to execute software instructions stored in a memory 154. The memory 154 may include one or more persistent memories (e.g., a hard drive/solid state memory) and stores one or more set of computer executable instructions/modules 160, as discussed below. For example, in an embodiment, the remote computing device 104 includes a GUI generation module 162, a mapping module 164, a query module 166, a schema module 168, and a graph module 170. The remote computing device 104 may further include one or more database 180, an input device 182, and an output device 184.

The NIC 152 may include any suitable network interface controller(s), such as wired/wireless controllers (e.g., Ethernet controllers), and facilitate bidirectional/multiplexed networking over the network 106 between the remote computing device 104 and other components of the environment 100 (e.g., another remote computing device 104, the client computing device 102, etc.).

The one or more modules 160 implement specific functionality. For example, in an embodiment, the GUI generation module 162 generates GUI portions and/or GUI data. The GUI generation module 162 may transmit such portions and/or data to the client computing device 102 via the network 106. For example, in embodiments wherein the client computing device 102 retrieves/receives data for display, the client computing device 102 may transmit a request to the GUI generation module 162. The request may specify a database query, such as selecting all tables, all database, or all data in a database. In some embodiments, the request may include one or more queries written in a query language (e.g., SQL).

The mapping module 164 may include an object relational mapper (ORM). The ORM may comprise computer-executable instructions for converting between code (e.g., object-oriented code) and data (e.g., data stored in an electronic database). Using the ORM, the user can write object-oriented code by describing database objects and concepts as object-oriented classes. The database can then be accessed/created by executing the object-oriented code. The mapping module 164 may include language bindings for performing data introspection and other tasks for automatically generating the ORM computer-executable instructions. The query module 166 may include instructions for querying one or more electronic database (e.g., the database 180). In some embodiments, tables are linked by foreign keys, which the mapping module 164 may use to determine relationships between tables.

In some embodiments, the query module 166 may include an application programming interface (API) such as a REST or SOAP API for allowing other components of the environment 100 (e.g., the client computing device 102) to access the database 180 indirectly, using a protocol other than a native database protocol. Thus, instead of authoring SQL queries, for example, any of the modules 120 of the client computing device 102 may issue an HTTP GET or POST request to access data in the electronic database 180. Embodiments that enable indirect access via an API advantageously allow the database 180 to be changed without affecting the instructions executed by the client computing device 102. For example, the database 180 could be switched from MySQL to Oracle without affecting the GET or POST queries issued by the client computing device 102. The query module 166 may include a library of utility functions for formatting queries safely (e.g., for performing query string interpolation while avoiding injection attacks). The query module 166 may access the schema module 168 to receive/retrieve information regarding the schema of one or more databases in the database 180. The query module 166 may include instructions for finding related tables for display, in some embodiments.

The schema module 168 may include one or more schema structures each representing a respective logical view of a schema (e.g., a database schema or an entity schema) in the database 180. For example, the schema module 168 may represent the one or more schema structures according to a hierarchical view, such as a flow chart, or native (e.g., SQL) statement. In some embodiments, the schema module 168 may accept a parameter for returning a representation of a schema in a particular format (e.g., as a native statement, as a flow chart, as an XML document, etc.). The schema module 168 may include instructions for automatically generating a database schema, given an existing database. The schema module 168 may include multiple sets of database binding instructions for accessing different types of databases. In some embodiments, the schema module 168 may include multiple versions of client bindings for accessing different versions of the same RDBMS (e.g., MySQL v4.0, MySQL v5.0, etc.)

The graph module 170 includes computer executable instructions for generating a graph corresponding to a database. For example, the graph module 170 includes computer instructions for generating a graph including the schema of databases in the database 180. The graph may include, for example, one or more nodes corresponding to a database, a table, a user, etc. The GUI generation module 162 may generate data and/or a GUI that includes some or all of a graph generated by the graph module 170.

The database 180 may be implemented as a relational database management system (RDBMS) in some embodiments. For example, the data store 130 may include one or more structured query language (SQL) database, a NoSQL database, a flat file storage system, or any other suitable data storage system/configuration. In general, the database 180 allows the client computing device 102 and/or the remote computing device 104 to create, retrieve, update, and/or retrieve records relating to performance of the techniques herein. For example, the database 180 may allow the client computing device 102 to retrieve database schema information. The database 180 may include a Lightweight Directory Access Protocol (LDAP) directory, in some embodiments. The client computing device 102 may include a module (not depicted) including a set of instructions for querying an RDBMS, an LDAP server, a NoSQL database, etc. For example, the client computing device 102 may include a set of database drivers for accessing the client computing device 102. In some embodiments, the database 180 may be located remotely from the remote computing device 104, in which case the remote computing device 104 may access the database 180 via the NIC 152 and the network 106.

In operation, the user may use the environment 100 to visually explore one or more electronic database in one or more RDBMS by accessing the GUI application module 122 of the client computing device 102. The user may use the GUI application module 122 to connect to an RDBMS by, for example, typing a Data Source Name (DSN) into a user interface, via the GUI application module 122. The GUI application module may support Open Database Connectivity (ODBC), which allows the user to specify the DSN in a platform-independent manner. For example, the user may type a DSN in a DSN format such as "[protocol]://username:password@hostname:port/database" wherein protocol specifies the database protocol or RDBMS type (e.g., oracle), the username, password, hostname, port, and database specify, respectively, a username for connecting to the RDBMS, a password associated with the username, a hostname (e.g., the IP address or hostname of the remote computing device 104), a port number at which to connect on the hostname, and a name of a database to select. Once the user has specified a DSN, the user can query the database using control elements of the GUI application module 122, as depicted in FIG. 2.

The modules of the remote computing device 104 may load data from the database 180 into the memory 154 and/or transmit data to the memory 114 of the client computing device 102. For example, once the user has selected a database, the query module 166 may traverse each relationship from the table of interest to the root table of the table of interest, via any intermediate tables. The query module 166 may select all records from the root table and traverse back to the table of interest, loading each record from the intermediate records into memory 154. The memory 154 may include instructions for automatically transferring the data loaded into memory to the GUI application module 122 for display. The query module 166 may match records from the most adjacent table.

Exemplary User Interfaces

Figure 2:
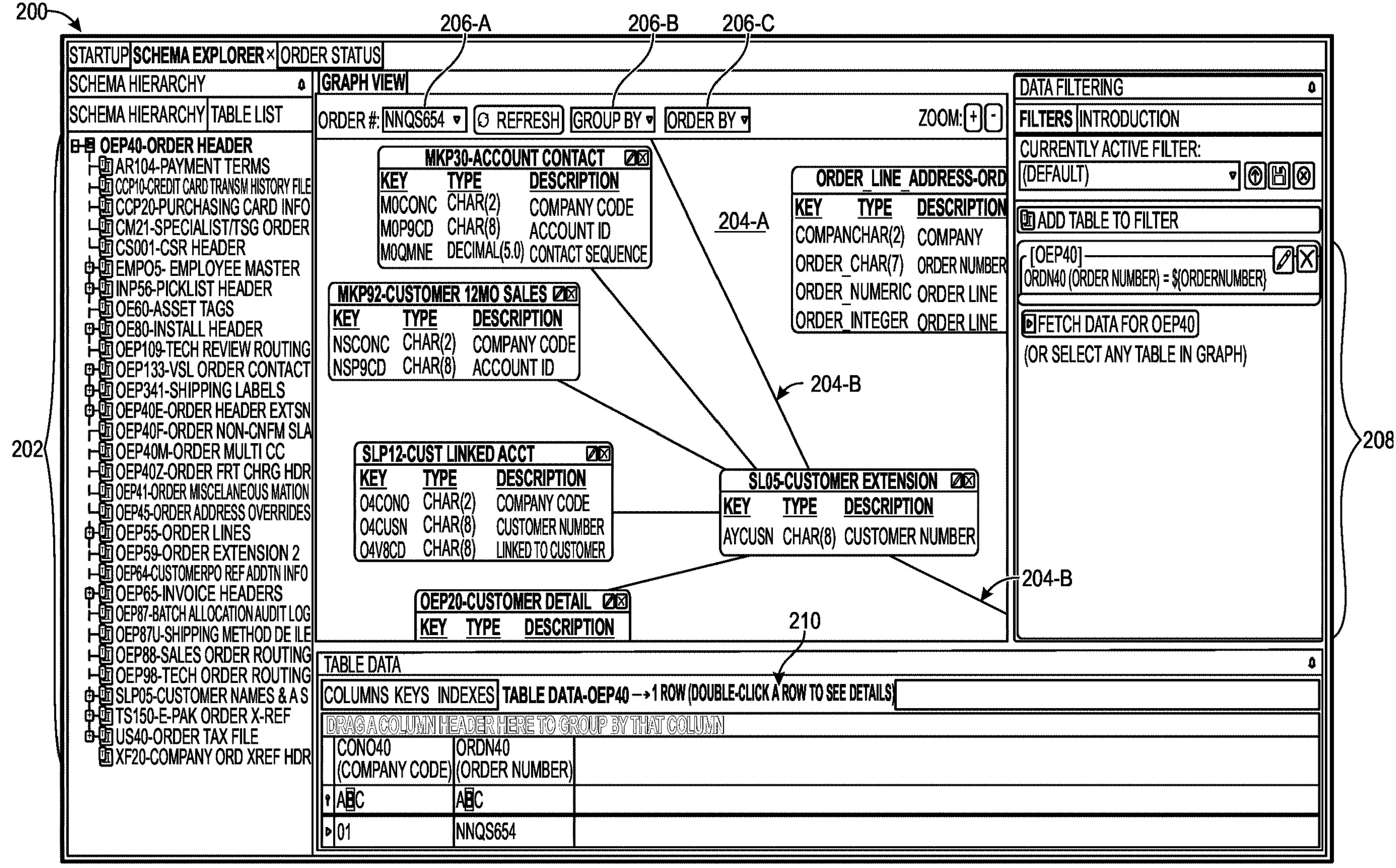
FIG. 2 depicts an example schema explorer graphical user interface.

FIG. 2 depicts an example schema explorer GUI 200. The schema explorer GUI 200 may display a database table list 202, a visual graph 204-A including multiple graph edges 204-B connecting graph nodes, persistent filter inputs 206-A-206-C, a filter list 208 and a data result list 210. Generally, the user can inspect the schema displayed in the table list 202 as a reference or may enter one or more value (such as an order number) into the filter inputs 206-A-206-C to see data. As the user navigates tables visually, the schema explorer GUI 200 may automatically filter out all but the rows in the database related to the order number, and display the rows in the data result list 210.

The table list 202 includes a list of tables in a database. For example, the table list 202 may be popular tables (i.e., tables that users often want to see), all tables in a database, all tables in multiple databases, etc. Each of the tables in the table list 202 may include an expansion control element, depicted using a plus sign, which the user may activate to expand a table having child tables (e.g., a node table). The table list 202 may be a hierarchical tree, as depicted, or displayed using any other suitable structure. It should be appreciated that not all tables have child tables (e.g., the table "AR104—Payment Terms" in the depicted example). That is, a table may be a leaf node. It should also be appreciated that some child tables may themselves have children. Thus, the table list 202 may be a recursive tree having any number of nested nodes and leaves. The user may navigate the table list 202 by opening and closing node tables. The table list 202 may depict table relationships, in some embodiments. For example, the root table node (i.e., the table named "OEP40—Order History") in the table list 202 may be in a one-to-one, one-to-many, or many-to-many relationship with another table in the table list 202, such as the "OEP 55—Order Lines" table, for example.

The visual graph 204-A, includes one or more nodes corresponding to tables, wherein relationships between the table nodes are depicted using graph edges 204-B. The example schema explorer GUI 200 a persistent filter input 206-A, a persistent group by input 206-B, and a persistent order by input 206-C. The user may enter an input parameter into the persistent filter input 206-A (e.g., an order number) while viewing a first table node (e.g., OEP40). The user may then select a second node in the table list 202 (e.g., the table OEP55) by, for example, clicking on the table using a mouse. Selecting the second node causes the schema explorer GUI 200 to display information from the OEP55 table matching the entered input parameter (e.g., order numbers matching the order number typed by the user). The persistent filter input 206-A is persistent in the sense that the visual graph 204-A applies the user's entered input parameter as the user accesses subsequent tables. Therefore, the user is able to advantageously follow relationships between tables by navigating the table list 202 and/or the table nodes in the visual graph 204-A, while only viewing information that is relevant to the user's filter parameter.

The user may select to aggregate the visual graph 204-A. For example, the user may group the visual graph 204-A according to the persistent group by input 206-B, and/or order the visual graph 204-A by one or more fields from the persistent order by input 206-C. In addition to the aggregation parameters (e.g., grouping and/or ordering fields), the user can add any number of filters while viewing a table. When the user adds a filter, the GUI 200 restricts the output of the data result list 210. It should be appreciated that aggregation types other than grouping and ordering are supported, including without limitation, summing, averaging, bitwise operations, counting, mathematical operations (e.g., a maximum, a minimum, a standard deviation, etc.), etc.

The example schema explorer GUI 200 further includes a filter list 208, wherein the user can add additional filter parameters. For example, the user can set a second filter parameter for customer Hewitt. Then, to continue the above example, when the user selects a table, any relations (e.g., foreign keys) are followed, and the displayed results include table records wherein the order number matches the order number filter parameter, and the customer matches the customer filter parameter. The user can add multiple input parameters and may use operands other than equality. For example, the user may add a filter parameter "OEP55—Order Lines >$100". By doing so, filtering module 164 would retrieve those orders that are $100 or more in the previously-selected order number, for the user Hewitt. When the user navigates to another table that is related (e.g., Parts File), only the parts in the Parts File matching the existing filter criteria are displayed. The schema explorer GUI 200 may automatically add entries to the filter list 208 when the user types a filter into the persistent filter inputs 206-A-206-C, and the user may edit the entries.

As indicated above, the present techniques allow the user to work with tables linked by foreign keys. However, some systems (e.g., AS400) do not include the concept of foreign keys. For example, OEP40 and OEP55 may have a one-to-many relationship (e.g., for each OEP40, there are many OEP55) and the RDBMS may enforce this relationship. Specifically, the RDBMS will cause an exception to be generated if the foreign key constraint is violated by application code. In some embodiments, an intermediate table may be generated to allow the user to emulate a foreign key or primary key relationship in an RDBMS that does not include such concepts. In those cases, the schema explorer GUI 200 may advantageously include instructions for emulating the key relationships in a way that appears to the user to add foreign key/primary key support to the lacking RDBMS. By doing so, the RDBMS prevents the user from corrupting data by violating key constraints.

The visual graph 204-A is zoomable and scrollable, in some embodiments, and advantageously allows a user to determine which tables are related, and the type of relation between each table. For example, the graph edges 204-B (e.g., lines) may include type information depicting whether the linkage between two given tables is a one-to-one linkage, one-to-many linkage, etc. The user may select (e.g., click) the related tables to view those tables, as filtered by the existing filter criteria/parameters in the filter list 208. For example, the user may access the input device 140 of FIG. 1 to cause a mouse click event to be generated. The GUI application module 122 may receive the mouse click event, and determine that the user has clicked on a node in the visual graph 204 corresponding to a particular table.

The dispatch module 124 may cause the name of the table and the current context, retrieved from the context module 126, to be transmitted to the remote computing device 104, wherein the GUI generation module 162 receives the name of the table and the current context. Based on the current context and the name of the table, the GUI generation module 162 may call the schema module 168 to retrieve the table corresponding to the table name, and any tables that are related to the table (e.g., via a foreign key lookup). The GUI generation module 162 may transmit information via the NIC 152 back to the client device 102, wherein the GUI application module 122 receives the information via the input device 140 and displays the information in the output device 142. The information transmitted and displayed may be a graphical representation of part of the database schema (e.g., a hierarchical data structure corresponding to the graph of the plurality of table schema of the visual graph 204), wherein the table selected by the user is in focus, or centered, in the visual graph 204. In some embodiments, the GUI application module 122 may include instructions for animating graphical transitions from a first table to a second, user-selected table. For example, the transmitted information may be an encoded representation of the table schema and values (e.g., a JavaScript Object Notation (JSON) representation). In response to receiving the encoded representation from the remote computing device 104, the GUI application module 122 of the client device 102 may evaluate the encoded representation to generate the graph of the plurality of table schema of the visual graph 204.

In the depicted example of FIG. 2, the graph of the plurality of table schema in the visual graph 204 includes multiple tables (e.g., Account Contact, Customer, Cost Linked Acct., Customer Detail, etc.) that are related to the Customer Extension table. In some embodiments, the user may save the filter in the filter list 208 for later use, and/or load a saved filter by selecting from the currently active filter dropdown (e.g., by saving and/or loading the filter and/or persistent filters 206-A-206C in the query database 146).

When the user inputs one or more filtering parameters via the persistent filters 206-A-206-C and/or the filter list 208, and selects a table, rows matching the filters and aggregations may be displayed in a table data result list 210. The table data result list 210 may include a plurality of display tabs that the user may click to view information related to the matching rows, such as the columns of the matching rows, the keys of the matching rows, the indexes of the matching rows, and/or the table data (i.e., values) of the matching rows.

Each of the tables in the schema explorer GUI 200 may include a table code name and table a descriptive name (e.g., OEP40, "Order Header"). The table code name may refer to the name of the table, and be stored in a table name field of a RDBMS, whereas the table descriptive name is stored in a table of table descriptive names, wherein each key in the table of table descriptive names is a table code name. In this way, a module generating the schema explorer graphical user interface 200 (e.g., the GUI generation module 162 of FIG. 1) may retrieve a table descriptive name for a given table code name, and cause one or both of the table code name and table descriptive name in a graphical user interface, for the convenience of the user. In particular, the example schema explorer GUI 200 is advantageously useful not only for new users, who are unfamiliar with the table layout (e.g., table code names), but also for reducing the overall complexity of the database system for experienced users. In some cases, the table descriptive names may be stored in a flat file that the GUI generation module 162 accesses when generating the schema explorer graphical user interface 200. The flat file may be generated periodically, such that the schema explorer GUI 200 always includes the latest mapping from table code names to table descriptive names.

It should be appreciated that the present techniques are useful for representing legacy RDBMS systems visually. However, the mapping between table code names and table descriptive names is useful even in a non-legacy system. For example, a first system developer may not provide meaningful or self-evident table names. Later, a second developer may want to explore the schema created by the first developer using the schema explorer window 202, and may find the ability to map names invaluable. Further, some developers may create names that are partially descriptive, but which are formatted poorly (e.g., which include underscores, CamelCase, symbols, abbreviations, case inconsistencies, etc.). In such cases, a user (e.g., a developer, business user, account manager, etc.) may find navigating the inconsistent table names messy, and distracting. However, by using the table code name to table descriptive name mapping, the user can advantageously avoid the inconvenience. It may appear at first glance that the developer can simply rename improperly-named tables, so that the schema explorer GUI 200 displays a name that is the factual name of the underlying table. However, some systems include code that hard-codes table names, and so may cause such code to malfunction with unpredictable and perhaps disastrous consequences. The mapping module 164 advantageously skirts the potential pitfalls of modifying existing table schema.

It should be appreciated that the mapping module 164 may also be used to create mappings for other RDBMS concepts, such as database names, stored procedure names, usernames, transaction names, query alias names, entities, etc. In essence, any RDBMS concept that can be assigned a name can be assigned a descriptive name in accordance with the techniques described herein. Such multi-faceted naming may be accomplished by creating additional mapping tables (e.g., a separate table for mapping transaction code names to transaction descriptive names, and/or by adding a "type" column to an existing mapping table, such that the type of the mapping can be determined by reference to the type column). For example, a mapping of type "username" may be denoted by the number 3.

Figures 3, 4:
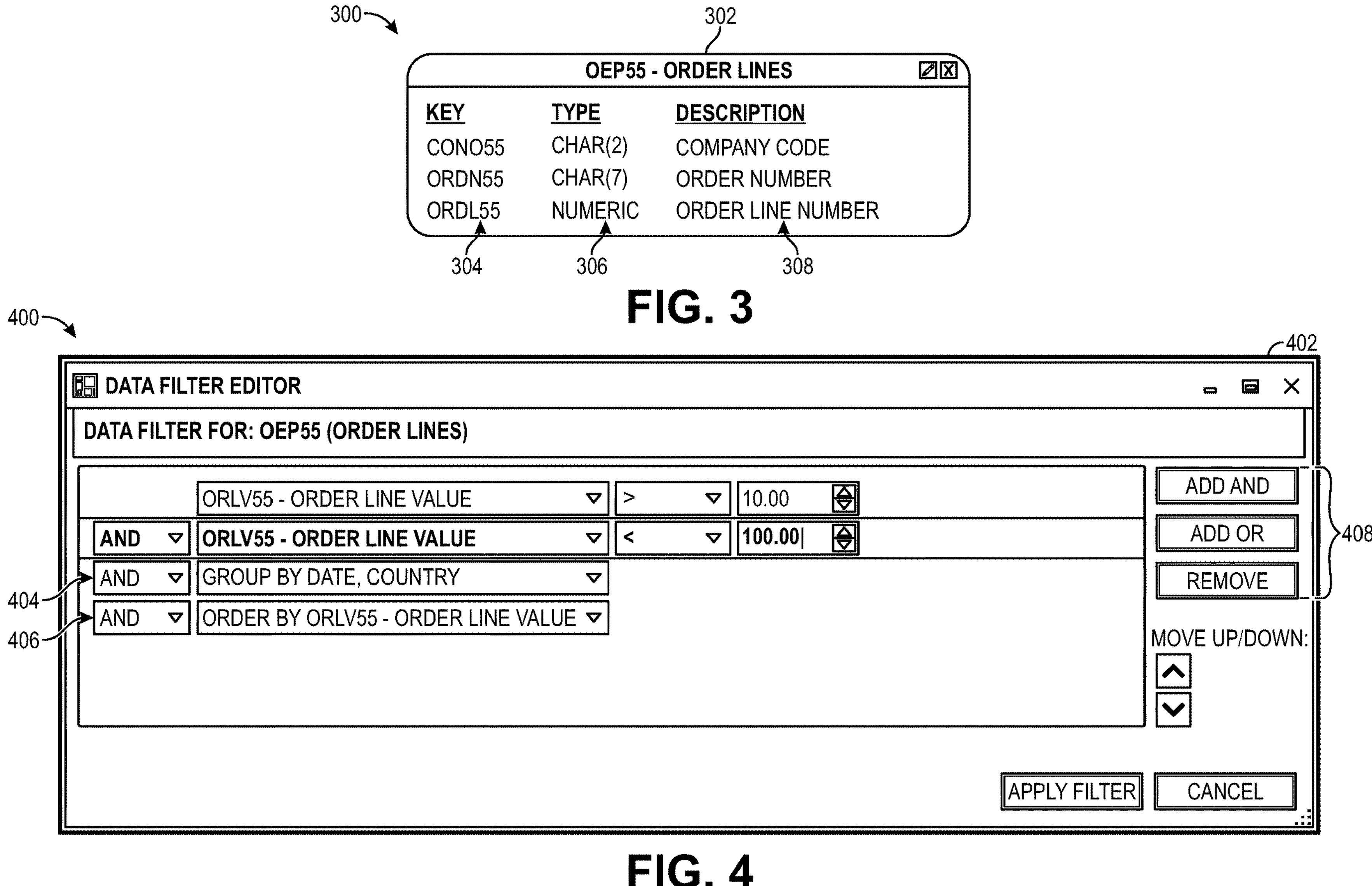
FIG. 3 depicts an example table schema, including multiple keys having respective code names, descriptive names, and data types, according to an embodiment.
FIG. 4 depicts an example data filtering graphical user interface, for building a logical filtering clause, according to an embodiment.

FIG. 3 depicts an example table node 300, more particularly a table schema 302, including multiple keys having respective code names 304, data types 306, and descriptions 308, according to an embodiment. The table schema 302 corresponds to a table code named OEP55, with the descriptive name of "Order Lines". A database administrator or software developer may have created the descriptive name "Order Lines" using a GUI (e.g., the GUI application module 122 of FIG. 1) to provide others with a clear indication of what type of data is contained in the legacy/code named database OEP55. Rather than needing to decipher the name OEP55 each time the user accesses the database, the user can simply read the descriptive name. Further advantageously, the user can read the respective descriptions 308 of the similarly cryptic key code names 304, to determine the keys that are applicable to the table schema 302. As seen in the next figures, the user can also determine linkages between the table schema 302 and other table schemas by analyzing the graph edges connecting the table schema 302 to other tables.

FIG. 4 depicts an example GUI 400, more particularly a data filtering GUI 402, for building a logical filtering clause, according to an embodiment. The data filtering GUI 402 includes two order line value filter clauses, followed by a group by aggregation clause 404 and an order by aggregation clause 406. In some embodiments, the data filtering GUI 402 is displayed when the user selects a "filter editor" element of the schema explorer GUI 200. The data filtering GUI 402 may include values populated previously by the user in the persistent filter inputs 206-A-206-C. For example, the value of the group by aggregation clause 404 and the value of the order by aggregation clause 406 may correspond, respectively, to the values that the user previously entered into the persistent filter inputs 206-B and 206-C. In some embodiments, values the user types into the by aggregation clause 404 and the order by aggregation clause 406 may be used to populate, respectively, the persistent filter inputs 206-B and 206-C. The dispatch module 124 of the client computing device 102 may be used to store and populate values between the various inputs. The user may use a series of GUI building buttons 408 to graphically build and/or manipulate the filters in the data filtering GUI 402. For example, the user may add/remove logical connectors/filter lines, and move the filters up and down in precedence. The depicted example is simplified for ease of explanation, but it should be appreciated that any number of Boolean logical operations may be supported, and that parenthetical grouping may be supported in some embodiments. When the user has finished building the filter clause, the user may apply the filter. By accessing the apply filter button, the user causes the filter to be received by the GUI application module 122. The GUI application module 122 may apply the filter to filter the display of existing data (e.g., data in memory) and/or request additional/different data from the remote computing device 104, using the user-defined filter clause as filtering criteria.

Figure 5:
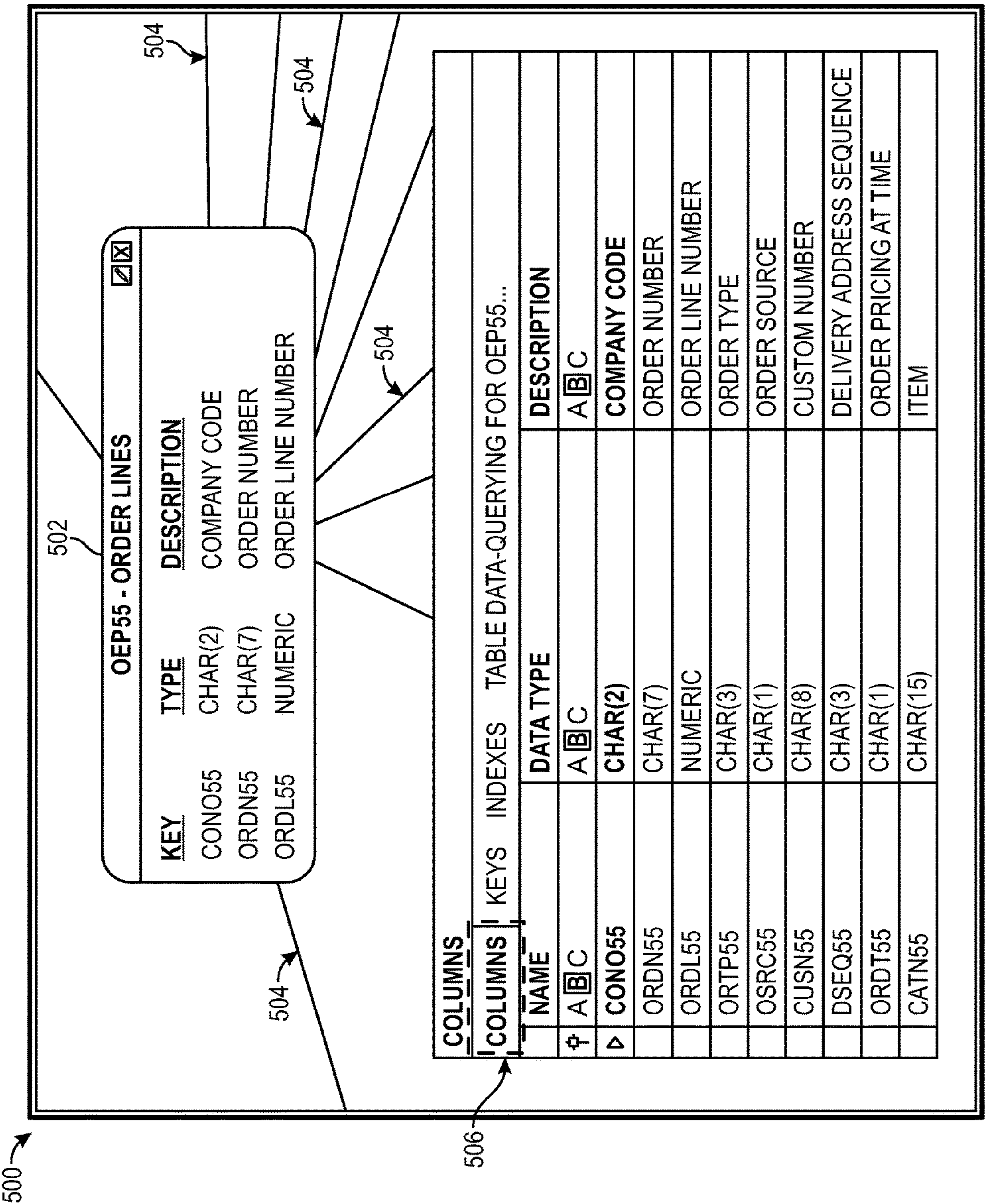
FIG. 5 depicts an example schema display graphical user interface, according to an embodiment.

FIG. 5 depicts an example schema display GUI 500, according to an embodiment. The schema display GUI 500 may correspond to a portion, or region, of the schema explorer GUI 200. The schema display GUI 500 includes a table schema 502 that may correspond to the table schema 302. The schema display GUI 500 further includes multiple graph edges 504 that may correspond to the multiple graph edges 204-B, for example. The schema display GUI 500 further includes a columns list 506 that may correspond to the table data result list 210. The columns list 506 may be a list of the columns that are available in the table represented by the table schema 502, along with the respective data types and descriptions of the columns.

Figure 6:
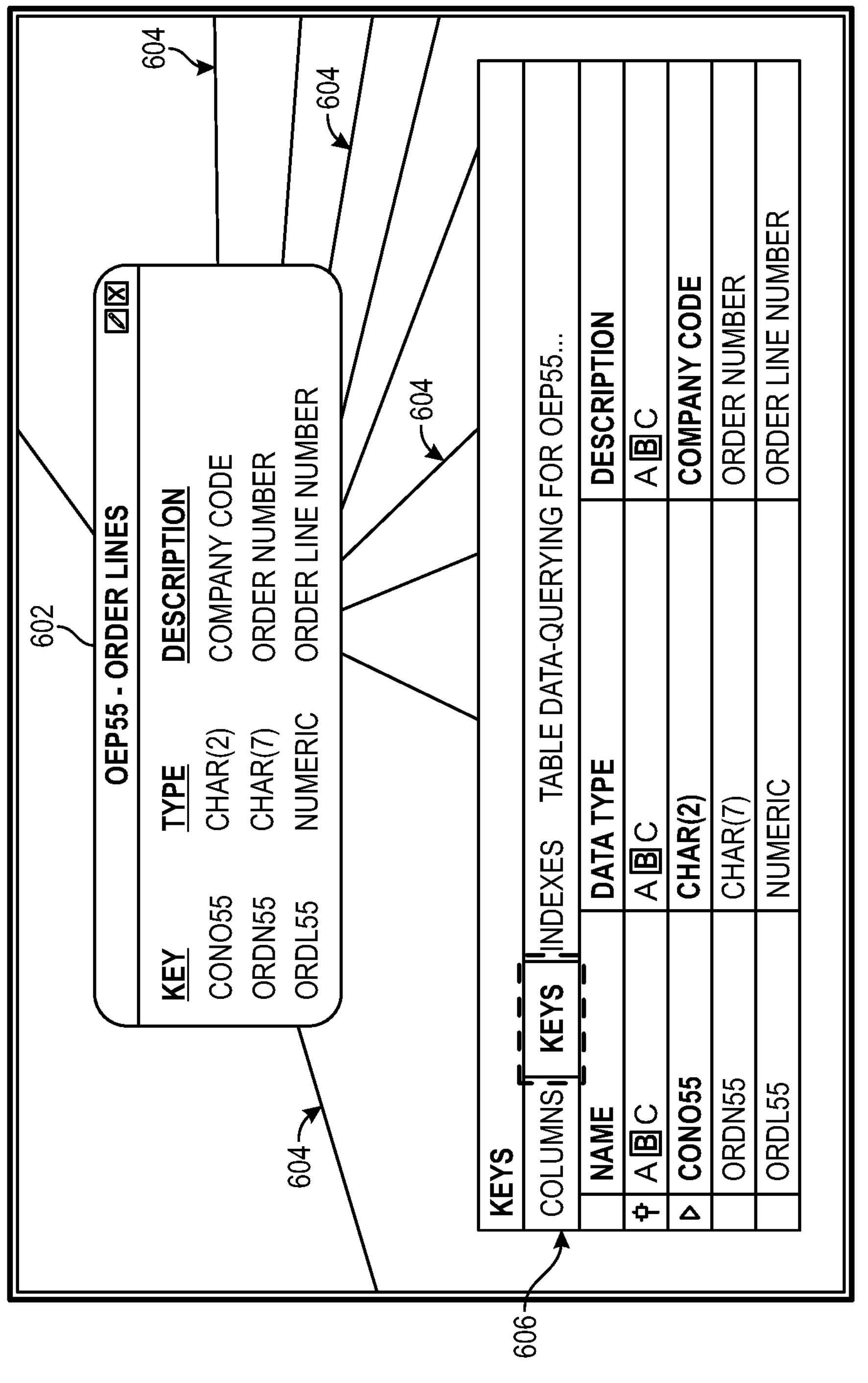
FIG. 6 depicts an example schema display graphical user interface, according to an embodiment.

FIG. 6 depicts an example schema display GUI 600, according to an embodiment. The schema display GUI 600 may correspond to a portion, or region, of the schema explorer GUI 200. The schema display GUI 600 includes a table schema 602 that may correspond to the table schema 302 and the table schema 502. The schema display GUI 500 further includes multiple graph edges 604 that may correspond to the multiple graph edges 204-B and the multiple graph edges 504, for example. The schema display GUI 600 further includes a keys list 606 that may correspond to the table data result list 210. The keys list 606 may be a list of the keys that are available in the table represented by the table schema 602, along with the respective data types and descriptions of the keys.

Figure 7:
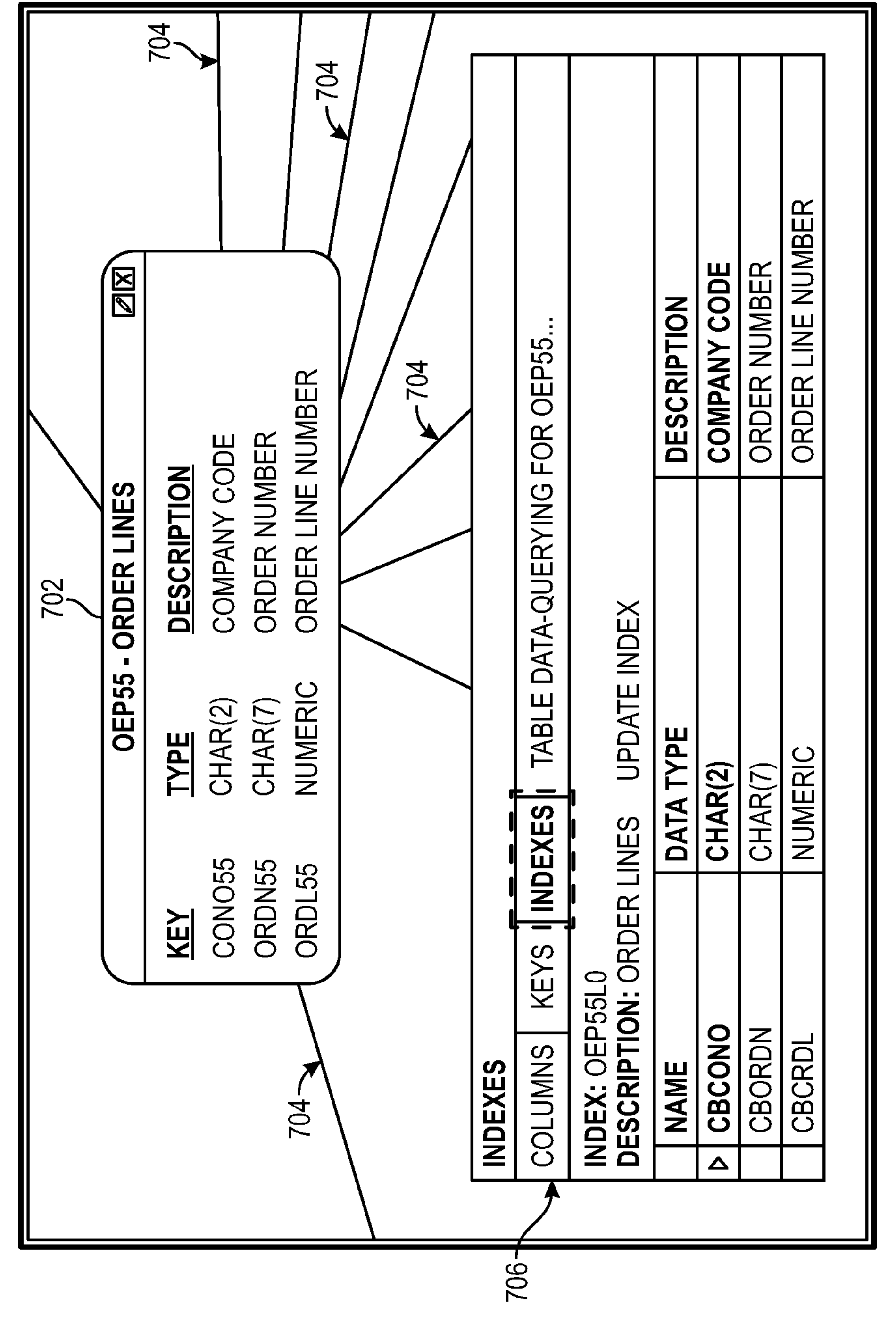
FIG. 7 depicts an example schema display graphical user interface, according to an embodiment.

FIG. 7 depicts an example schema display GUI 700, according to an embodiment. The schema display GUI 700 may correspond to a portion, or region, of the schema explorer GUI 200. The schema display GUI 600 includes a table schema 702 that may correspond to the table schema 302, the table schema 502, and the table schema 602. The schema display GUI 700 further includes multiple graph edges 704 that may correspond to the multiple graph edges 204-B, the multiple graph edges 504, and the multiple graph edges 604, for example. The schema display GUI 700 further includes an indexes list 706 that may correspond to the table data result list 210. The indexes list 706 may be a list of the indices that are available in the table represented by the table schema 702, along with the respective data types and descriptions of the indices.

FIG. 5, FIG. 6 and FIG. 7 depict information relating to, respectively, columns, keys, and indices that the user can access by selecting an appropriate tab within the table data result list 210 of schema explorer GUI 200. In some embodiments, the user can edit the name, data type, and description fields of the respective tabs in FIGS. 5-7.

EXEMPLARY METHODS

Figure 8:
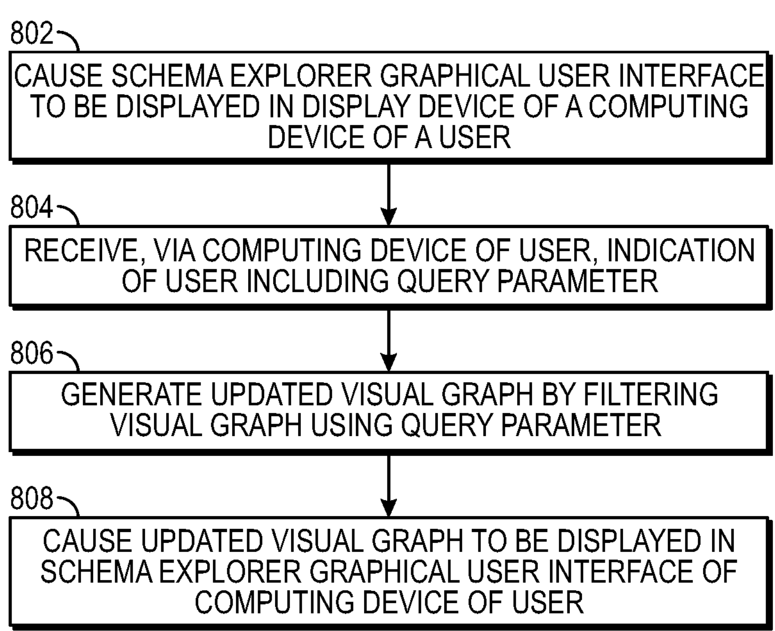
FIG. 8 depicts an example method for providing visual relational data exploration, according to one embodiment and scenario.

FIG. 8 depicts an example method 800 for providing visual relational data exploration, according to one embodiment and scenario.

The method 800 includes causing a schema explorer graphical user interface to be displayed in a display device of a computing device of a user, wherein the schema explorer graphical user interface includes a visual graph of a database schema including at least one table node (block 802). The schema explorer graphical user interface may correspond to the schema explorer graphical user interface 200 of FIG. 2. The schema explorer graphical user interface may be rendered by the GUI application module 122 of FIG. 1, for example, in the input device 140 of the client computing device 102. In some embodiments, the schema explorer graphical user interface may be displayed in another computing device, such as a different client computing device, the remote computing device, etc. In general, the schema explorer graphical user interface may be displayed in any computing device wherein such display is advantageous to a user such as a software developer, quality assurance user, a non-technical user, etc. As depicted in FIG. 2, the visual graph may include a plurality of tables arranged in the graph and connected by one or more edges. The edges may represent a key relationship (e.g., a primary key or a foreign key). The user may navigate the list of tables by selecting a named table from the list of tables in the schema explorer graphical user interface. In some embodiments, the user may perform administrative functions by selecting a table from the list of tables (e.g., cloning a database/table, deleting a table, etc.).

The method 800 includes receiving, via the computing device of the user, an indication of the user including at least one query parameter (block 804). The indication of the user may include one or more selections of controls and/or data in the schema explorer graphical user interface. The indication may include one or more input events captured from the input device 140. For example, the user may enter data into one or more of the persistent filter inputs 206-A-206-C, and then press an "Apply" button. In that case, the indication of the user would include the input(s) and an input device event (e.g., a mouse event, a keypress event, etc.). In some embodiments, the user may select a data filter editor window. When the user selects a data filter editor window, the data filter editor window may be displayed, as depicted in FIG. 4. The user may add filtering and/or aggregation criteria using the persistent filter inputs 206-A-206-C and/or the data filter editor window, and the active filters may be saved using the filter list 208 portion of the schema explorer graphical user interface 200 of FIG. 2, for example. When the schema explorer graphical user interface is first opened by the user, the result list 210 may include all results of every table included in the visual graph. The user may configure the list of included tables by, for example, selecting or deselecting tables within the visual graph. When the user has not selected any filters or aggregations, the result list 210 may include all rows from the tables in the visual graph. As the user adds filtering and/or aggregation parameters, the schema explorer graphical user interface may update the result list 210 to include only those rows that match the user's filter criteria/parameters.

Specifically, the method 800 includes generating an updated visual graph by filtering the visual graph of the database schema including the at least one table node using the at least one query parameter (block 806). In some embodiments, generating an updated visual graph may include reloading filtered data in the visual graph, deleting the visual graph, and adding the reloaded data to the graph. However, in some embodiments, the schema explorer graphical user interface may include instructions (e.g., stored in the memory 114 of FIG. 1) for modifying an in-memory copy of the visual graph, to remove rows that do not match the filtering parameters. For example, when the user is viewing the "AR104-Payment Terms" table, all rows are displayed in the result list 210 until the customer adds a filter parameter. All of the rows may be stored in the memory 114. When the user adds a filter parameter (e.g., order number) and a group by clause (e.g., date), the GUI application module 122 may access the in-memory data, and update the result list 210 with only the matching rows.

In some embodiments, once the user has specified a filter and/or aggregation, navigating to another table will apply the same filters to the other table. To continue the example, once the user provides an order number and group by date aggregation parameter, the user may select another table in the graph (e.g., CS001—CSR Header). Then, the rows in the newly-selected table that match the existing filter will be displayed, and are aggregated according to the existing aggregation criteria. In some embodiments the user types in filters and/or aggregation parameters, in others, the user selects filters and/or aggregation parameters from a predetermined list. In some embodiments, the graphing module 170 may be located in the client computing device 102, to better facilitate local generation of the graph depicted in FIG. 2.

The method 800 includes causing the updated visual graph to be displayed in the schema explorer graphical user interface of the computing device of the user (block 808). In embodiments, the GUI application module 122 of FIG. 1 may not store data in memory, and may load all data from the remote computing device 104 on demand. Therefore, when the user selects a filtering criteria, or an aggregation, the GUI application module 122 may retrieve the matching rows from the database 180 of the remote computing device 104. Other configurations are possible, including collocating the database 180 in the client computing device 102, and/or creating duplicated and/or backup copies of the database 180 in the client computing device 102.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of providing visual data exploration of a plurality of electronic databases, the method comprising:

causing a schema explorer graphical user interface to be displayed in a display device of a computing device of a user, wherein the schema explorer graphical user interface includes a visual graph of a first database in the plurality of electronic databases including at least one table node, representing at least one table, the at least one table node having at least one edge directly connecting the at least one table node to a different table node and depicting a field name, a field type, and a field description, wherein the at least one table node includes a legacy table code name and a respective mapped descriptive table name, wherein the at least one table includes a first relational key corresponding to the at least one edge, wherein the at least one table includes at least one of a second relational key or a field description identifier corresponding to the field description, and wherein the schema explorer includes one or more persistent filter inputs;

receiving, via the computing device of the user, an indication of the user including at least one query parameter corresponding to a respective one of the one or more persistent filter inputs;

receiving a user's selection of a second database;

generating, in response to the user's selection of the second database, an updated visual graph corresponding to the second database using the at least one query parameter; and causing the updated visual graph to be displayed in the schema explorer graphical user interface of the computing device of the user.

2. The computer-implemented method of claim 1, wherein causing the schema explorer graphical user interface to be displayed in the display device of the computing device of a user includes displaying a list of tables, each including the respective mapped descriptive table name.

3. The computer-implemented method of claim 1, wherein receiving the indication of the user including the at least one query parameter includes receiving an aggregation parameter.

4. The computer-implemented method of claim 3, wherein the aggregation parameter includes a group by parameter.

5. The computer-implemented method of claim 3, wherein the aggregation parameter includes an order by parameter.

6. The computer-implemented method of claim 1, further comprising:

displaying a data filter graphical user interface;

receiving an aggregation clause selection from the user;

displaying an aggregation clause corresponding to the aggregation clause selection in the data filter graphical user interface;

receiving a user application selection;

generating a second updated visual graph by filtering the updated visual graph using the aggregation clause selection; and causing the second updated visual graph to be displayed in the schema explorer graphical user interface of the computing device of the user.

7. The computer-implemented method of claim 1, further comprising:

receiving, via the computing device of the user, a selection of a second table node; and causing the schema explorer graphical user interface to be displayed in the display device of the computing device of the user, wherein the schema explorer graphical user interface includes the visual graph of the first database including at least the second table node, wherein the visual graph of the first database is filtered according to the indication of the user including the at least one query parameter.

8. The computer-implemented method of claim 1, wherein the first electronic database is a structured query language database.

9. A server comprising:

one or more processors; and a memory storing instructions that, when executed by the one or more processors, cause the server to:

cause a schema explorer graphical user interface to be displayed in a display device of a computing device of a user, wherein the schema explorer graphical user interface includes a visual graph of a first database in a plurality of electronic databases including at least one table node, representing at least one table, the at least one table node having at least one edge directly connecting the at least one table node to a different table node and depicting a field name and a field type, and a field description, wherein the at least one table node includes a legacy table code name and a respective mapped descriptive table name, wherein the at least one table includes a first relational key corresponding to the at least one edge, wherein the at least one table includes at least one of a second relational key or a field description identifier corresponding to the field description, and wherein the schema explorer includes one or more persistent filter inputs;

receive, via the computing device of the user, an indication of the user including at least one query parameter corresponding to a respective one of the one or more persistent filter inputs;

generate, in response to the user's selection of a second database, an updated visual graph corresponding to the second database using the at least one query parameter; and cause the updated visual graph to be displayed in the schema explorer graphical user interface of the computing device of the user.

10. The server of claim 9, wherein the instructions further cause the server to:

cause the schema explorer graphical user interface to be displayed in the display device of the computing device of a user includes displaying a list of tables, each including the respective mapped descriptive table name.

11. The server of claim 9, wherein the instructions further cause the server to:

receive an aggregation parameter.

12. The server of claim 11, wherein the aggregation parameter includes a group by parameter.

13. The server of claim 11, wherein the aggregation parameter includes an order by parameter.

14. The server of claim 9, wherein the instructions further cause the server to:

display a data filter graphical user interface;

receive an aggregation clause selection from the user;

display an aggregation clause corresponding to the aggregation clause selection in the data filter graphical user interface;

receive a user application selection;

generate a second updated visual graph by filtering the updated visual graph using the aggregation clause selection; and cause the second updated visual graph to be displayed in the schema explorer graphical user interface of the computing device of the user.

15. The server of claim 9, wherein the instructions further cause the server to:

receive, via the computing device of the user, a selection of a second table node; and cause the schema explorer graphical user interface to be displayed in the display device of the computing device of the user, wherein the schema explorer graphical user interface includes the visual graph of the first database including at least the second table node, wherein the visual graph of the first database is filtered according to the indication of the user including the at least one query parameter.

16. The server of claim 9, wherein the first electronic database is a structured query language database.

17. A non-transitory computer readable medium containing program instructions that when executed, cause a computer to:

cause a schema explorer graphical user interface to be displayed in a display device of a computing device of a user, wherein the schema explorer graphical user interface includes a visual graph of a first database in a plurality of electronic databases including at least one table node, representing at least one table, the at least one table node having at least one edge directly connecting the at least one table node to a different table node and depicting a field name and a field type, and a field description, wherein the at least one table node includes a legacy table code name and a respective mapped descriptive table name, wherein the at least one table includes a first relational key corresponding to the at least one edge, wherein the at least one table includes at least one of a second relational key or field description identifier corresponding to the field description, and wherein the schema explorer includes one or more persistent filter inputs;

receive, via the computing device of the user, an indication of the user including at least one query parameter corresponding to a respective one of the one or more persistent filter inputs;

generate, in response to the user's selection of a second database, an updated visual graph corresponding to the second database using the at least one query parameter; and cause the updated visual graph to be displayed in the schema explorer graphical user interface of the computing device of the user.

18. The non-transitory computer readable medium of claim 17 containing further program instructions that when executed, cause a computer to:

receive an aggregation parameter.

19. The non-transitory computer readable medium of claim 17 containing further program instructions that when executed, cause a computer to:

display a data filter graphical user interface;

receive an aggregation clause selection from the user;

display an aggregation clause corresponding to the aggregation clause selection in the data filter graphical user interface;

receive a user application selection;

generate a second updated visual graph by filtering the updated visual graph using the aggregation clause selection; and cause the second updated visual graph to be displayed in the schema explorer graphical user interface of the computing device of the user.

20. The non-transitory computer readable medium of claim 17 containing further program instructions that when executed, cause a computer to:

receive, via the computing device of the user, a selection of a second table node; and cause the schema explorer graphical user interface to be displayed in the display device of the computing device of the user, wherein the schema explorer graphical user interface includes the visual graph of the first database including at least the second table node, wherein the visual graph of the first database is filtered according to the indication of the user including the at least one query parameter.

* * * * *